Patented June 29, 1943

2,322,880

UNITED STATES PATENT OFFICE 2,322,880

PROCESS OF PICKLING, CURING, AND PRESERVING FRUITS AND VEGETABLES

Alfred Pollak, New York, N. Y.

No Drawing. Application June 5, 1941, Serial No. 396,708

7 Claims. (Cl. 99—156)

This invention relates to a method of improving preserves of vegetable matter, such as for example cucumbers.

The word "vegetable" as used in this specification includes herbaceous plants, roots, bulbs, as well as fruits and generally all matter belonging to the vegetable kingdom.

Vegetables decay unless specially treated or kept in cold storage. Such specially treated vegetables are usually called "preserves." Besides this primary purpose, preserving methods have been refined so as to render the crude vegetables more palatable by the use of spices and condiments.

A common preserving method consists in pickling the vegetables. Pickling is carried out for instance by means of vinegar or a brine (i. e. a salt solution). At the present time, the following goods, in pickled form, are of prime commercial importance: cucumbers ("pickles"), green peppers, onions, cauliflower, green olives, beets, cabbage, sauerkraut, etc.

The present invention is especially directed to these pickled vegetables, because of their commercial importance, although the new invention is equally applicable to other preserving methods.

The chemical changes taking place during the process of preserving foodstuffs, briefly are, as follows:

Vegetables are preserved by keeping them in a salt brine, which is concentrated enough to keep out all deleterious fermentations, but which is not too strong to prevent a spontaneous acid fermentation, such as a lactic acid fermentation. The formed lactic acid serves as a preservative, and the green goods can be stored for a very long time without refrigeration and without the danger of being spoiled by some other unfavorable fermentation. At the same time an osmotic process takes place between the constituents of the goods and of the brine. Salt enters into the body of the vegetables, while certain soluble substances migrate from the body into the brine, such as sugars, and certain raw and harsh tasting components of the body fluid. By a spontaneous sour fermentation, the sugar is converted mostly into lactic acid, the whole taste of the goods is changed favorably, and the tissues of the bodies are mellowed at the same time by enzymatic actions. However, goods preserved in a strong salt brine have to be processed before being packed into the ultimate containers to rid them of the surplus salt which would make them unpalatable. Moreover, sugar, vinegar and other spices and condiments are added.

Certain parts of the vegetable crop have to be pickled and cured in a very short time after the harvest and must be brought to the consumer as quickly as possible. A good example for this is the so called "genuine dill pickle." Their fermentation has to be practically finished in but a few weeks. The salt brine must be much weaker than in the previous cases. The spices and condiments are added directly to the salt brine and must be used up in a much shorter period. A quickened and healthy sour fermentation, in the case of dill pickles, is therefore of paramount importance. Their taste and value as a wholesome condiment are of course much superior to those of goods made exclusively out of salted stock. The reason for this is that they need not undergo such extensive brining and consequent leaching processes. Naturally, the soluble mineral constituents, and the vitamins present in the fruit, are much better preserved.

In the case of sauerkraut, sour cabbage, sour shredded beets, the technical situation is somewhat different, because there is no extra salt brine used. The shredded goods are stored in wooden containers, and in forming layer after layer during their manufacture, a certain amount of salt is added in between layers. Subsequently, by osmosis and autolysis, the moisture of the goods is released and forms a juice which contains, besides the originally added salt, all the soluble parts of the shreds brought in solution such as sugars, mineral salts as well as nitrogen-containing compounds. In this juice a spontaneous sour fermentation soon takes place to form a preserving medium which is similar to the case discussed above.

A special problem is encountered in the case of cucumbers and more particularly with the so-called "genuine dill pickles." The main difficulty is that after a short time the formation of a parasitic yeast scum starts in the dill pickle containers in which torula yeast, wild yeast and mycoderma develop. The parasites ferment the sugar present, eat up the lactic acid, form carbonic acid gas and bring the closed barrels to explosive condition. Besides this drawback, the disappearance of the lactic acid allows the rapid growth of certain pectin-decomposing bacteria, such as *Bacillus proteus, Bacillus vulgatus,* megatherium, mesentericus and others. They soften the cured goods, make them slimy and finally spoil them.

As in most spontaneous fermentations, so in the commercial manufacture of pickled goods, many hazards and uncontrollable influences are encountered. It is, of course, of great importance to always produce uniform merchandise of the same quality and flavor.

It is the object of the present invention to overcome these and other difficulties as will become apparent from the following description.

In brief, I discovered that preserving processes are greatly and unexpectedly improved by an addition of "steepwater." Steepwater is a waste product obtained in the manufacture of corn starch.

The same favorable results are obtained by using an admixture of presswater of potatoes, extracts from malt sprouts and brans (soured during the extracting process to favorably increase the lactic acid content), furthermore soluble parts of cotton seed, of soya beans, liquid slops from distilleries and similar products which are derived as waste products in the processing of respective raw materials. I further discovered that these improvements in the preserving process are brought about by the action of phytin and other compounds of the bios complex contained in the materials mentioned.

As the "steepwater" from starch factories is at present the most typical and economical representative of these additional materials, the calculations in the following practical examples are based on its use.

The average constitution of "steepwater," calculated on the basis of dry substances, is substantially as follows:

| | Per cent |
|---|---|
| Nitrogen-containing substances, including amino-acids (calculated as $N \times 6.25$) | 40–50 |
| Carbohydrates | 11–15 |
| Total acids (calculated as lactic acid) of which about 50% are lactic acid | 12–17 |
| Mineral matter | 15–18 |
| which include: | |
| $P_2O_5$ | 6–9 |
| CaO | 0.3–0.6 |
| MgO | 2–3 |
| $K_2O$ | 4–6 |

I found that an admixture of steepwater for instance caused a vigorous lactic acid fermentation from the very beginning whereby obnoxious fermentation was eliminated. At the same time I found that the presence of amino-acids was very favorable in furthering the development of lactic acid and buffering the acid effect so that a higher maximum of acid was formed in a very short time.

After many experiments, I discovered that steepwater is a very favorable substratum for a quick start of the lactic ferment and it carries the acid formation to a higher maximum than it was possible to reach heretofore. The results thus obtained are more favorable than in cases in which the brine was inoculated with charges of pure cultures of acid forming bacteria. Vegetables treated with such cultures during the pickling process acquire a flavor and aroma quite different and lacking in body. Besides, it is practically impossible to sterilize the green raw material thoroughly enough before inoculation with a pure culture.

Heretofore, sugar has been added directly to the first pickling solution in order to improve the lactic acid fermentation. However, this addition of sugar fails to produce results comparable with those of the present invention. This is especially true in the case of cucumbers and tomatoes because there sugar is migrating too slowly from the inside of the fruit into the brine. Therefore, the formation of the lactic acid is too slow and the danger of a faulty fermentation becomes too great.

The initial addition of lactic acid to the brine to start the fermentation in a rather sour medium produces an improvement because the lactic acid allows a selective sour acid fermentation and keeps out putrid fermentations. However, this improvement does not produce nearly as good results as the process according to my invention.

In this connection it should be noted that in some years and in certain regions, cucumbers with very thick skins are grown and the same are delivered to the pickle manufacturer for quick curing. The osmosis in such a case is going on too slowly and it is quite impossible to leach out the raw and bitter taste present in such fruits in the short time during which the goods are undergoing fermentation and curing. Similar difficulties are encountered in the pickling of other kinds of vegetables.

These and other difficulties are completely overcome by the present invention. The invention, both on an experimental and on a large scale, produced unexpected results. Not alone did the sour fermentation start earlier and proceed longer and further but also the formation of yeast scum was stopped almost completely in batches treated according to the invention. In contrast thereto, in parallel batches to which lactic acid was added in amounts to have the same acidity at the start of the fermentation as in the batches according to the invention, yeast scum was formed as usual. No yeast scum and no spoilage occurred in the batches treated in accordance with the invention.

Furthermore, at the same time a much faster and stronger osmosis between the brine and the body of the fruit to be pickled was obtained in these batches. I discovered that this result was due to the higher lactic acid formation in a strongly buffered medium and a stimulated action of the hemicellulose-dissolving enzymes in the fruit body. The result of this was a much faster curing of the pickles. Even bitter and harsh tasting fruits, which under normal processing could not be used at all for this purpose, became sweet and palatable in a short time.

With the disappearance of all yeast formation, which is a source of constant loss to the manufacturer, a considerable improvement in the quality of the finished pickles was obtained. The processed goods preserve a fresh and sweeter taste much longer and their texture stays crisp much longer. I also found that these products keep their green color for a considerable time, a fact which proves to be of great advantage in the production of "half-sour pickles."

Another reason for these favorable results is the elimination of all faulty fermentations and the simultaneous suppression of the yeast scum formation. These I attribute to the presence of the greatly invigorated lactic acid fermentation. No development of deleterious fermentations as for instance those caused by bacteria belonging to the groups of *Bacillus vulgatus*, *Bacillus mesentericus* or subtilis-megatherium. These bacteria add to the spoilage of plant tissues by the formation of excessive amounts of liquefying enzymes. At the same time the products of their metabolism are changing the taste of vegetable matter in a very unfavorable way.

Also, discoloration may take place due to intensified oxydative processes.

I discovered that in preserving vegetables, phytins and their cleavage products produce a stimulating effect on the multiplying and acid forming capacity of the lactic acid bacteria. The phytin are preferably added in the form of phytin containing materials. At the same time, it is the presence of amino-acids which is of importance, because they are a valuable nutrition for the stimulated bacteria and simultaneously are buffering the medium. The favorable results of this combination have been described before. If desired, organic acids may be added to the compound according to the invention. Besides the aforementioned active ingredients, this compound contains other components which until now have neither been scientifically defined nor isolated. In some cases these components have only been summarized as "bois complex." These components act like phytohormones. In combination with the above defined active ingredients, these undefined components exercise a selective action on the various organisms involved in the preserving of vegetables. These undefined substances favor the development of the lactic acid forming bacteria, and are completely inhibiting the development of yeast organisms. Otherwise, it would not be possible, that in one case where lactic acid is added to the fermenting batch, the yeast formation is as usual or even increased, whereas, in a batch of exactly the same composition, but where one of the described extracts according to the invention is added, no formation of yeast takes place at all, as above described.

These results were unexpected and are highly important to the pickling industry.

My invention also produces a favorable action on finished products when they are added to the brine in the ultimate container. Certain products, such as so called old fashioned "piccalilli" and pickled beets which are very perishable, have to be sterilized before delivery to the trade and the containers when once opened have to be kept under refrigeration to avoid rapid spoilage. This condition can be ameliorated when the acid content of the brine is kept much higher. But this must be done without damaging the palatability by using a buffering substance which camouflages the higher acidity.

Illustrative examples of carrying out the present invention are given in the following:

Example I

Genuine dill pickles

Wooden barrels are filled with cucumbers, the usual spices and dill weed. Then the pickles are covered with a brine containing 25-28 salometer degrees of salt and 1 oz. of steepwater for every gallon of brine.

(In the absence of steepwater the brine has to be made more concentrated, 28-33 salom. degrees, otherwise the fermentation is very unclean.

The acidity of this brine may be increased with dill-vinegar of lactic acid to about 0.2-0.3%, calculated as lactic acid. Then the barrels are closed and after two days they are opened again and the brine replenished to the top. The barrels containing the steepwater are now closed airtight and kept closed during the whole period of curing. Due to the fact that the growth of yeast is very much restricted, there is no danger of explosion of the barrels. (In the absence of steepwater, the barrels have to be watched continuously to avoid explosions by the developing carbonic acid gas.)

If steepwater is used, the acidity reaches 0.7% after about four days of fermentation. (Without steepwater, this acidity level is reached only after eight days of fermentation.)

After about thirty days, 1.4% acidity was reached and the same continued at this level. (Without steepwater, the acidity had decreased to 0.6%.)

The salt concentration was 28 salometer degrees in both cases at the start. This concentration proved to be too low for the regular fermentation without steepwater, the pickles became partly soft. With the same salt concentration an excellent product was achieved in the barrels with added steepwater.

In spite of the lower salt concentration, which vouchsafes better palatability of the pickles, no addition of a preservative such as sodium benzoate is necessary to prevent spoilage.

Example II

Pickling of green tomatoes, peppers and the like

The method of pickling these vegetables is practically the same as the one described in connection with the pickled cucumbers. Steepwater is added to the brine at the rate of ½–1 ounce per gallon. The products cured in such a brine taste sweeter on account of the stronger buffering action. Therefore, it is possible to keep these brines on a higher acidity which adds to the protection of the goods against spoilage. Nevertheless, the finished goods do not have a too sour taste.

Example III

Manufacture of sauerkraut

In the manufacture of sauerkraut and of similar shredded preserves the adding of the vegetable compounds has to be adjusted to the process, as there is no brine used. Only the genuine juice is formed by salting the shredded cabbage, thereby inducing osmosis and formation of the sauerkraut juice in which the sour fermentation takes place.

The addition of the vegetable compound is done in this way that for instance steepwater of 50-60% dry substance is diluted with water, until it is liquid enough that it can be sprinkled on the layers of salt, which are imbedded between layers of shredded cabbage.

The amount of salt is between 2-3% of the total weight of the cabbage; the amount of steepwater added is 5-15% of the weight of the salt, or in this case, about 0.125-0.5% of the weight of the cabbage.

The results here are similar to those reached with cucumbers. The maximum of acidity is reached in about half of the time it takes without the addition of the compound according to the invention. The taste of the finished product is mellower and the texture is more crisp.

Example IV

Manufacture of pickles, sauerkraut and the like by using starters

In special cases it is advisable to run a scheme for the addition and distribution of the compound according to the invention which is comparable to the use of "starters" in various other fermentations. The underlying idea is to start the sour fermentation in a small part of the goods, for instance 5-15%, to add to this part the whole of the new compound, or if this should not be possible on account of a too high acid or salt content, then at least 25-50% of it. This arrangement will start in the respective fruits, or shredded vegetables a very fast and strong selective lactic acid fermentation. As soon as this fermentation is well under way, this "starter" is distributed uniformly in the bulk of the goods to be fermented; in this way a more uniform and stronger sour fermentation is obtained.

I claim:

1. Improved method of preserving vegetables which consists in pickling the vegetables with a pickling solution containing, diluted therein, a substance selected from the group of organic acid and phytin containing waste products consisting of steepwater from corn starch factories, presswater from potato starch factories and spent washes from distilleries.

2. Improved method of pickling vegetables comprising placing the vegetables in a brine and adding to the brine a substance selected from the group of organic acid and phytin containing waste products consisting of steepwater from corn starch factories, presswater from potato starch factories and spent washes from distilleries.

3. The method claimed in claim 2, in which approximately between one half of one ounce to two ounces of said selected substance is added to each gallon of brine.

4. The method of pickling vegetables comprising dividing the vegetables to be treated into a large bulk portion and a small starter portion, adding to the starter portion a substantial part of the steepwater intended for the total quantity of vegetables, starting a strong fermentation in the starter portion and thereafter mixing the starter and bulk portions with each other.

5. The method of pickling vegetables which comprises placing the vegetables in a brine, leaving the vegetables in the brine until maturity and completion of the pickling and thereafter incorporating steepwater in the brine in which the vegetables are kept after completion of the pickling process.

6. An improved brine for preserving vegetables comprising an admixture of a substance selected from the group of phytin and organic acid containing waste products consisting of steepwater from cornstarch factories, presswater from potato starch factories and spent washes from distilleries.

7. Method of producing sauerkraut, comprising shredding cabbage, salting the same, and adding to the shredded and salted cabbage a phytin containing substance selected from the group of waste products consisting of steepwater from cornstarch factories, presswater from potato starch factories, and spent washes from distilleries, the phytin containing substance added amounting to from 5 to 15% of the weight of the salt mixed with the shredded cabbage.

ALFRED POLLAK.